March 19, 1968     J. L. STEMPLE     3,373,838
AIR CUSHION DEVICE WITH HEIGHT CONTROLLING BLEED HOLES
Filed June 19, 1967     2 Sheets-Sheet 1
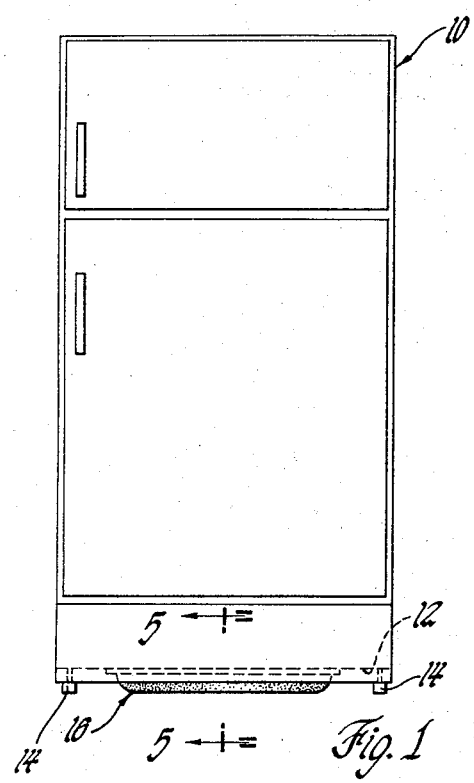
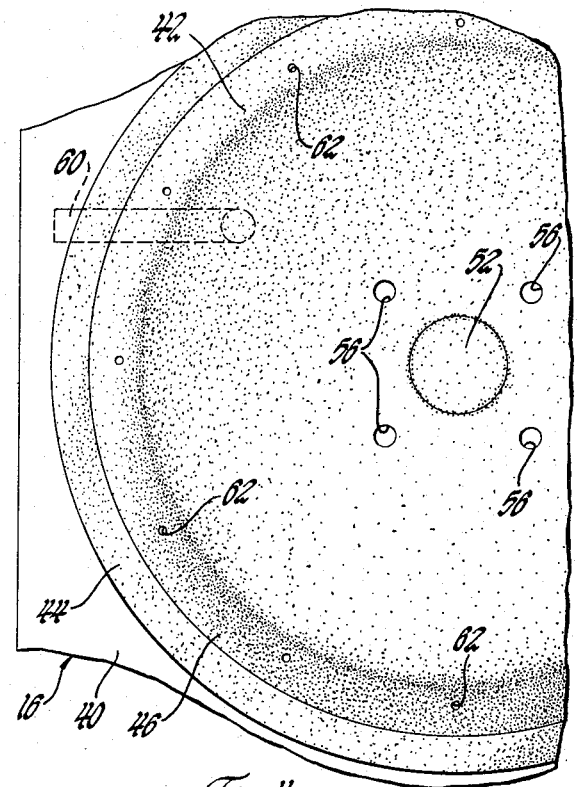
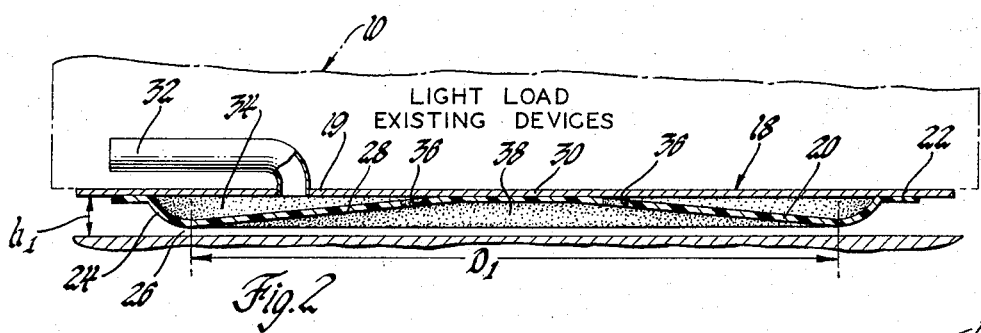
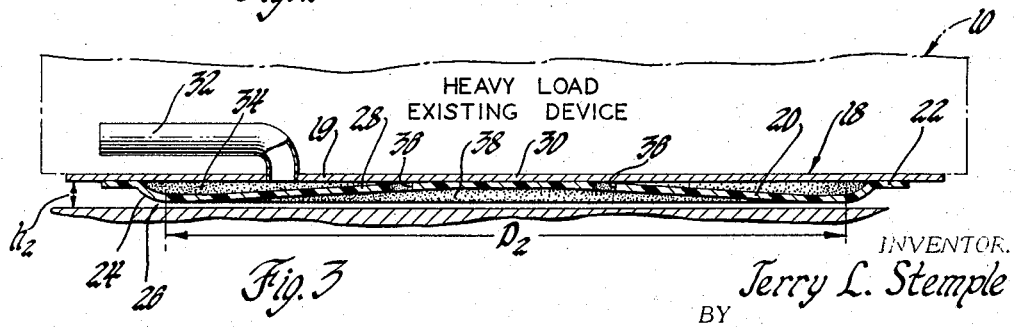
INVENTOR.
Terry L. Stemple
BY
ATTORNEY March 19, 1968     J. L. STEMPLE     3,373,838

AIR CUSHION DEVICE WITH HEIGHT CONTROLLING BLEED HOLES

Filed June 19, 1967     2 Sheets-Sheet 2

INVENTOR.
Jerry L. Stemple
BY
J.C. Evans
ATTORNEY

United States Patent Office 3,373,838
Patented Mar. 19, 1968

3,373,838
AIR CUSHION DEVICE WITH HEIGHT CONTROLLING BLEED HOLES
Jerry L. Stemple, Decatur, Ill., assignor to General Motors Corporation, Detroit, Mich., a corporation of Delaware
Filed June 19, 1967, Ser. No. 646,991
2 Claims. (Cl. 180—124)

ABSTRACT OF THE DISCLOSURE

In preferred form, an air cushion device including a platform, a flexible diaphragm underlying the platform and fixed to the platform to define a continuously curving depending convolution spaced from the ground to define a perimetrical throttling gap and further including an inflatable annular cavity between the diahpragm and platform and a plenum cavity between the diaphragm and ground bounded by the perimetrical throttling gap, a plurality of bleed holes in the continuously curved depending convolution directing fluid pressure from the inflatable annular cavity, the plurality of bleed holes being selectively located in communication with said plenum cavity in accordance with load changes on the platform.

Figure 5:
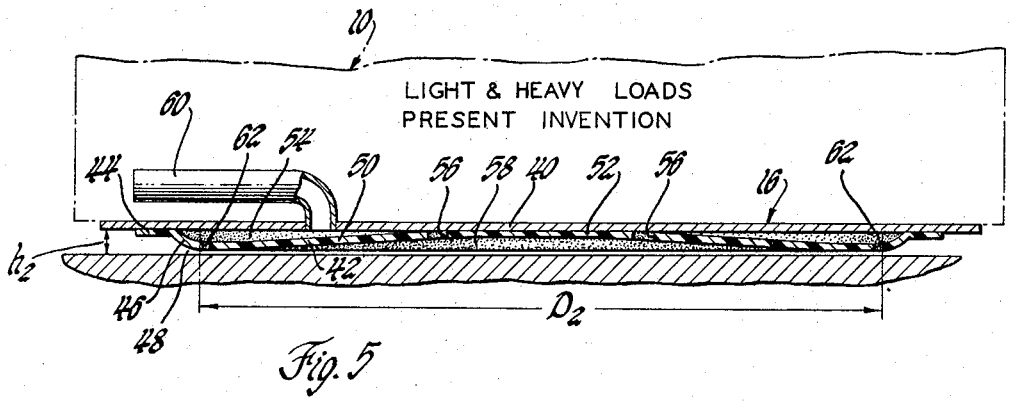

This invention relates to ground proximate air cushion devices of the type including a flexible plenum forming depending diaphragm on the underside of a platform and more particularly to a modified depending diaphragm including a plurality of integral flow control openings therein operatively positioned in response to load changes on the platform to produce fluid pressure conditions below the device that result in maintenance of a desired height relationship between the platform and ground.

Ground proximate air cushion devices of the type more specifically set forth in United States Patent No. 3,321,038 to Mackie et al. are adapted for connection to an external air supply source such as a vacuum cleaner or the like serving as a fluid pressure source for inflating an annular cavity between a depending flexible diaphragm and a platform of the device to form a plenum cavity between the diaphragm and ground which receives fluid flow from the annular cavity.

At times certain high pressure sources will produce a high air flow delivery that passes from the inflatable annular cavity into the plenum cavity and thence through a perimetrical annular pressure throttling control gap during operation of the device. To obtain optimum performance of the device, desirably, air flow into the plenum cavity should be controlled so that the device will have a continuously upwardly acting air lift directed thereagainst capable of supporting variable loads on the platform without forcing the underlying diaphragm against the ground or without an upward lift that raises the device to destroy the control gap.

Under minimum design loading conditions, it is observed that a predetermined high rate of air delivery can cause the platform to have an increased inflation height between the platform and ground, a resultant reduction in the planar extent of the uplifting air support and a consequent lack of stability against platform tipping forces.

The increased inflation height can be compensated, in certain instances, by the provision of auxiliary wheels or outrigger accessories that will give horizontal stability against off-center, tipping loading and the like acting on such high flying platforms. These accessories components, however, must adjust for variations in the inflation height which occurs on changes in the loading on the device and such adjustability is in many applications both difficult and expensive to obtain.

A further problem that exists in certain devices of the aforedescribed type, is that when the device is lightly loaded and is connected to a pressure source having predetermined high fluid flow delivery rates, the pressurized flow passes from the plenum cavity of the unit through the throttling gap to cause the diaphragm at the throttling gap to be rapidly vibrated at high frequencies like a reed to produce an undesirable audibly observable squeal.

Accordingly, an object of the present invention is to improve the stability of ground proximate air cushion devices of the type including a load supporting platform having a flexible underlying diaphragm fixed to the platform at outer and inner margins to define an annular depending convolution at the outer margin connected to the inner margin by a dished central portion to form an inflatable fluid receiving annular cavity between the diaphragm and platform and a plenum cavity between the diaphragm and ground, by the provision of, air relief means on the device responding to variations in the shape of a perimetrical throttling gap of the device to selectively deflate the inflatable annular cavity of the device to maintain a substantially constant height relationship between the platform of the device and the ground.

Another object of the present invention is to improve the stability of ground proximate air cushion devices of the type including a platform, a diaphragm underlying the platform and fixed at its outer and inner margins to the platform to define an annular depending convolution approaching contact with the ground at a narrow annular throttling gap zone between the margins and wherein the diaphragm and platform define an inflatable annular cavity therebetween and a plenum cavity between the diaphragm and the ground and further wherein communicating holes are present in the diaphragm to direct fluid flow from the annular cavity to the plenum cavity thence to flow through the perimetrical throttling gap between the lowest extremity of the convolution and the ground, by the provision of, a plurality of small diameter bleed holes in the convolution normally located radially inwardly of the perimetrical throttling gap to direct air into the plenum cavity and positioned by the convolution in response to a predetermined platform loading to direct fluid flow exteriorly of the plenum cavity to deflate the annular cavity thereby to maintain substantially a constant foot print diameter of the throttling gap and a resultant substantially constant inflation height between the platform and the ground whereby the device is subjected to less tipping instability and the diaphragm is less susceptible to air flow induced high frequency movements capable of producing a squeal.

Further objects and advantages of the present invention will be apparent from the following description, reference being had to the accompanying drawings wherein a preferred embodiment of the present invention is clearly shown.

Figure 6:
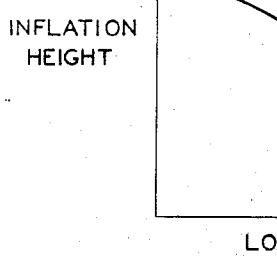
Figure 7:
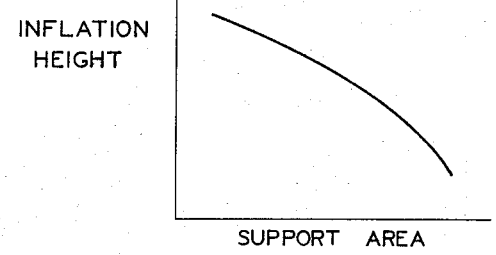
Figure 8:
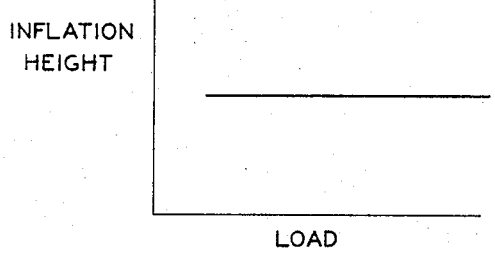
Figure 9:
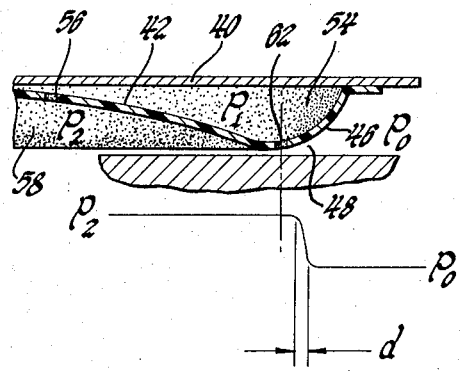

In the drawings:
FIGURE 1 is a view in front elevation of a refrigerator including the present invention;
FIGURE 2 is a vertical sectional view of a prior art ground proximity fluid supporting device under a light load condition;
FIGURE 3 is a vertical sectional view of the device in FIGURE 2 under a heavy load condition;
FIGURE 4 is a bottom elevational view partially broken away of the fluid cushion supporting device of the present invention;
FIGURE 5 is an enlarged vertical sectional view taken along the line 5—5 of FIGURE 1;
FIGURES 6 and 7 are charts showing the relationship between inflation height, load and support area, respectively, in the prior art devices of FIGURES 2 and 3;

FIGURE 8 is a chart showing the relationship between inflation height and load in the present invention; and FIGURE 9 is a diagrammatic view of a portion of the fluid cushion supporting device of the present invention having a superimposed fluid pressure profile.

Referring now more particularly to the drawings, in FIGURE 1 is illustrated a refrigerator 10 representing a typical load having maximum and minimum weights and which is desirably moved with respect to its supporting ground with a minimum of friction.

The refrigerator 10 more particularly includes a base 12 of, in the illustrated arrangement, generally rectangular form having an adjustable leveling screw 14 at each corner thereof to locate the base 12 in a desired parallel relationship with the supporting ground for the refrigerator and at a desired height relationship therewith.

Secured to the base 12 is a ground proximity fluid cushion supporting device 16 constructed in accordance with certain principles of the present invention.

The device 16 is a type of fluid cushion supporting device, an example of which is shown in United States Patent No. 3,321,038 to Mackie et al. Reference may be had to the Mackie et al. patent for a more complete description of units of this type, but for purposes of the present application, units of the Mackie et al. type are shown in FIGURES 2 and 3 in fragmentary sectional form to illustrate two loading conditions found in existing devices of this type.

In FIGURE 2, a unit 18 is illustrated including a platform 19 having a flexible diaphragm 20 disposed horizontally beneath the platform including a peripheral portion 22 hermetically attached to the underside of the platform 19. The diaphragm 20 includes an intermediate diameter portion defining a continuously curving, depending convolution 24 spaced from the platform 18 and defining a narrow annual or perimetrical throttling gap 26 where the lowermost extremity of the convolution approaches a ground supporting surface for the fluid cushion supporting device. The convolution 24 is connected to a centrally located dished portion 28 of the diaphragm 20 which is restrained at an inner margin point 30 to the platform. The prior art device of FIGURE 2 has a fluid supply inlet conduit 32 that directs pressurized fluid into an annular inflatable chamber 34 formed between the diaphragm 20 and the platform 18. Additionally, the unit includes a plurality of communicating holes 36 adjacent the inner marginal restraining point 30 to communicate the inflatable chcamber 34 with a plenum or cavity 38 formed between the diaphragm 20 and the supporting ground. The plenum 38 is bounded by the perimetrical throttling gap 26.

When a predetermined light load is carried by the device, as illustrated in FIGURE 2, the annular chamber 34 is inflated so that the diaphragm 20 will assume the configuration of FIGURE 2 producing a foot print diameter $D_1$ representing the diameter of the throttling gap in the device. The high rate of air flow will pass from the cavity 34 through the openings 36 and into the plenum 38 thence to flow through the annular space formed by the throttling gap 26. This produces a predetermined lifting force on the platform causing it to assume a predetermined inflation height $h_1$ with respect to the supporting ground.

One characteristic of prior art devices is illustrated by comparing the configuration in FIGURE 2 to that in FIGURE 3. When the device of FIGURE 2 is loaded to a greater degree, as seen in FIGURE 3, the continuously curving convolution 24 will shift laterally outwardly relative to the platform to increase the foot print diameter as shown at $D_2$ thereby increasing the effective supporting area on which the high flow delivery acts through its passage from inflatable chamber 34 into plenum 38 and across the annular perimetrical throttling gap 26. Concurrently, the leveling height of the device assumes a value $h_2$ that is less than the height $h_1$ as seen in FIGURE 2. The cross-sectional radius of convolution 24 thus decreases when the platform 19 is heavily loaded and thereby descending in parallel relation to ground. The cross-sectional radius of convolution 24 will increase as the platform 19 ascends in parallel relationship to the ground.

While in many applications the height variation between the platform and its supporting ground is of little consequence, in certain applications the leveling height variation can produce instability against tipping forces wherein one portion of the continuously curved outer convolution of the diaphragm 28 can engage the ground thereby removing the air cushion from beneath the load causing a loss of air support.

Another problem sometimes found in fluid cushion supporting devices of the type under consideration is that the pressure supply for inflating the diaphragm chamber 34 and producing the air lifting action within the plenum 38 is too great for light loads and as a result, the device will tend to ride high with respect to the supporting ground. In FIGURE 2, the greater leveling height relationship between platform and ground for a light load is demonstrated for comparison with the height of the platform as seen in a heavier load in FIGURE 3. A high rate of flow, as it passes from the plenum 38 through the perimetrical throttling gap 36, can at times, produce a high frequency movement of the lowermost portion or the continuously curved convolution 24 at the gap thereby producing a vibrating reed effect in the audio frequency range observable as a noisy squeal.

In accordance with certain principles of the present invention, the device, as seen in FIGURES 2 and 3 and as more specifically set forth and described in the above-mentioned Mackie et al. patent, is modified to include means for producing a substantially constant level platform height with respect to the supporting ground thereby to maintain a substantially constant foot print diameter to improve the stability of such devices and to furthermore eliminate the high frequency diaphragm movement and consequent squeal problem mentioned above.

To understand the present invention, reference may be had to FIGURES 6, 7 and 8 from which certain conclusions can be drawn. Existing units of the Mackie et al. type, as seen in FIGURES 2 and 3, are characterized by the fact that the inflation height of the platform of such units increases as the load decreases. This fact is generally shown in the chart of FIGURE 6. Thus, when such units are lightly loaded, as mentioned above, the platform of the unit will rise with respect to the supporting ground, thus subjecting the speed to an inherent horizontal instability against off-center loading on the platform.

Another characteristic of existing devices is seen in FIGURE 3 and the chart of FIGURE 7 wherein it is illustrated that as inflation height increases, the support area decreases. Thus, it can be concluded that for a given support area (that area bounded by a perimetrical gap such as 26 in FIGURES 2 and 3) a related inflation height can be expected. It follows that units with a constant inflation height will have a constant support area. This conclusion is supported by test data run on units of this type.

To obtain a constant support area under variable load conditions, the device 16 of the present invention, as illustrated in FIGURES 4, 5 and 9, includes a platform 40 having a flexible diaphragm 42 located in underlying relationship with the platform 40 and including a peripheral portion 44 thereon representing the outer margin of the diaphragm 42 hermetically attached to the platform 40. The diaphragm 42 includes an intermediate annular portion 46 defining a continuously curving depending convolution spaced from the underside of the platform and progressing from the underside of the platform at the peripheral portion 44 to a lowermost extremity defining a narrow annular zone 48 where the diaphragm 42 approaches but does not contact the supporting ground. The convolution 46 is connected to a dished central portion 50 in the diaphragm 42 which runs from the lowermost extremity of the convolution 46 to an inner marginal point 52 on the diaphragm which is connected to the underside of the platform 40. The diaphragm 42 thereby forms an inflatable annular chamber 54 beneath the platform 40 which, when inflated, causes the dished central portion 50 to assume a substantially conical cross-section as seen in FIGURE 5.

The unit also includes four equally spaced communicating holes 56 which supply pressurized fluid from the chamber 54 into a plenum or cavity 58 formed between the diaphragm 42 and the supporting ground which is bounded by the perimetrical annular space 48 forming a throttling gap for air flow from the cavity 58 outwardly on all sides of the illustrated device.

A typical pressure profile of a unit of the above-described type is illustrated in FIGURE 9 which shows a part of the device in an inflated condition. At this time, pressurized fluid supply from an inlet conduit 60 on the platform 40 passes a high fluid flow delivery into the chamber 54 to inflate the diaphragm 42 to produce the convolution 46 and conically shaped intermediate portion in the diaphragm 42 and produces a pad pressure $P_1$ within the cavity. Fluid flow from the chamber 54 into the plenum 58 produces a plenum pressure $P_2$ which is substantially equal to the pad pressure $P_1$. Fluid then flows from the plenum 58 radially outwardly through the annular gap 48 which has a width $d$ in the order of a few thousandths of an inch. The annular space causes a throttling action across the width $d$ with resultant rapid falling of pressure from $P_2$ to atmospheric pressure $(P_0)$. Immediately radially inwardly of the annular space 48 is located a plurality of small diameter bleed openings 62 which in one working embodiment of the invention, are twelve in number located at equally spaced 30 degree locations on the circumference of the convolution 46. The bleed openings 62 have a diameter of 3/16 of an inch and are located at a radius 9.84 inches from the center of the diaphragm 42 which in the working embodiment has a diameter of 22 inches.

By virtue of the inclusion of the plurality of bleed openings 62 at the above-described point on the convolution 46 of diaphragm 42, it is observed that the fluid cushion supporting device has a substantially constant leveling height and a commensurately substantially constant load supporting area bounded by the perimetrical throttling gap on the unit. Moreover, the low load and high load leveling height and supporting area of the modified units correspond to the more stable kind obtained only under heavy or maximum loading conditions in existing devices.

The constant height is obtained in the present invention in the following manner. With the air bleed holes 62 being located at the point described above, when the unit is unloaded, there is a momentary movement of the platform 40 above the ground support away from the leveling height $h_2$, as seen in FIGURE 5. The continuously curved convolution 46 will shift radially inwardly of the pad to locate the bleed openings 62 to communicate the annular pressurizable chamber 54 directly with the exterior of the unit without passing into the plenum 58. As a result, the bleed holes 62 will cause chamber 54 to be deflated a predetermined amount until the platform 40 returns to height $h_2$ from the ground at which point the convolution 46 will again locate the bleed holes 62 within the foot print defined by the throttling gap 48 thereby allowing the full air flow to pass through the plenum 58 and across the annular gap 48.

In the illustrated working embodiment of the invention, the diaphragm 42 has an outer peripheral diameter of 22 inches. The communicating holes 56 are four in number, equally spaced, and have a ½ inch diameter. The air bleed holes 62, as mentioned above, number 12 and have a 3/16 inch diameter. A configuration of this type results in a leveling height of 1.05 inches at a load of 310 pounds and a leveling height of .97 inch at a load of 610 pounds for a height differential of .08 inch. The foot print diameter varies between 18.8 and 19.9 inches.

When the air bleed openings are eliminated, at a load of 310 pounds, the leveling height is 1.59 inches and at a load of 610 pounds the leveling height is .91 inch for a differential leveling height of .68 inch. The foot print diameter of the unit without bleed holes varies between 17.4 inches and 20.0 inches at 310 and 610 pounds loads respectively. At 310 pounds load and a fluid flow of 20.8 s.c.f.m. through the conduit 60, the diaphragm 42 squealed.

The inclusion of the bleed holes results in a more stable load supporting area since lightly loaded units still have a reduced leveling height (that which occurs normally upon heavy loadings in existing fluid cushion devices of the type seen in FIGURES 2 and 3). Furthermore, since the air bleed holes of the working embodiment are located outwardly of the perimetrical throttling gap under light loading conditions, a high air flow delivery of 26 s.c.f.m. rather than all passing through the plenum and across the throttling gap into a high frequency vibration producing relationship with the lowest extremity of the convultion 48, in part, will flow directly outwardly of the device to eliminate the aforedescribed noisy squeal problem in units of this type.

The above described operating unit, of course, is merely representative of one working embodiment of the present invention, it being understood that, while a single pad is illustrated, the invention is equally suited for plural pad arrangements and furthermore, while circular bleed holes are illustrated, it will be appreciated that air bleed holes formed as elongated openings and/or slots and the like are contemplated by the present invention.

While the embodiment of the present invention as herein declosed constitutes a preferred form, it is to be understood that other forms might be adopted.

What is claimed is as follows:

1. A ground proximity fluid cushion supporting device comprising, a platform, a flexible diaphragm disposed horizontally beneath said platform, said diaphragm including a peripheral portion attached to said platform, an intermediate annular portion defining a continuously curving depending convolution spaced from said platform progressing from the peripheral portion to a narrow annular zone approaching contact with the ground and a dished central portion connected centrally of said convolution and to said platform above the lowermost extremity of said convolution thereby forming an inflatable annular cavity between said diaphragm and said platform and a plenum cavity between said diaphragm and the ground, the latter cavity being bounded by a perimetrical throttling gap formed between the lowermost extremity of said convolution and the grounds, means for introducing fluid under pressure directly into one of said cavities, and means for establishing and maintaining equal fluid pressure in said cavities, the cross-sectional radius of said continuously curving convolution progressively decreasing when said platform descends in parallel relation to the ground and progressively increasing when said platform ascends in parallel relation to the ground, and means for maintaining a controlled height relationship between said platform and the ground, said means including a plurality of small diameter bleed holes located in said convolution at spaced circumferential points therearound, each of said bleed holes communicating with said annular cavity for bleeding a predetermined amount of fluid from said annular cavity exteriorly thereof, each of said bleed holes being located by said convolution at a point immediately inwardly of said throttling gap when said platform is loaded to a predetermined maximum degree, said continuously curving convolution as said platform ascends in parallel relation to the ground upon being lesser loaded locating said bleed holes at a point outwardly of said throttling gap whereby said plurality of bleed holes directs fluid from said inflatable annular cavity without passage through said plenum cavity thereby to deflate said annular cavity to maintain a desired height relationship between said platform and the ground and to prevent excessive air flow through said throttling gap and consequent high frequency movements in said diaphragm at said lowermost extremity of said convolution thereby to minimize squeal and instability during operation of the device.

2. A ground proximate air cushion device comprising, a platform, a diaphragm underlying said platform and fixed thereto at its outer and inner margins defining an annular depending convolution approaching contact with the ground at a narrow annular zone between the margins, means for supplying fluid at superatmospheric pressure within the convolution, means for establishing and maintaining corresponding pressure in the space between the diaphragm and the ground surface radially within the narrow annular zone and flowing with throttling through the said zone whereby the diaphragm is subject to a first significant pressure differential between supplied pressure and atmospheric pressure radially outwardly of the zone and a second negligible pressure differential between supplied pressure at opposite sides thereof radially inwardly of the zone, said first pressure differential acting to induce a substantially circular cross-sectional curvature in said convolution from the outer margin to said narrow annular zone, and said first and second pressure differentials coacting to permit the former to radially tension the portion of said convolution within said zone into a substantially conical cross-section, a plurality of small diameter openings in said depending convolution located between said inner margin and said narrow annular zone when said platform is loaded to a predetermined maximum, said plurality of bleed holes communicating with said superatmospheric pressure within said convolution for supplying said superatmospheric pressure to the space between said diaphragm and said ground pressure within the narrow annular zone during maximum loading of said platform to maintain a desired height relationship between the platform and the ground, said depending convolution shifting laterally on a predetermined reduction in loading on said platform to change the cross-sectional curvature in said convolution from said outer margin to said inner margin causing said plurality of bleed holes to be located outwardly of said narrow annular zone whereby fluid is free to flow from within said convolution exteriorly thereof without passing through said annular throttling zone whereby said platform is subjected to a lesser lifting force and thereby maintained substantially at a desired height relationship with respect to the ground.

No references cited.

A. HARRY LEVY, *Primary Examiner.*